United States Patent [19]
Scheib

[11] 4,169,377
[45] Oct. 2, 1979

[54] QUANTITY SENSING SYSTEM FOR A CONTAINER

[75] Inventor: William F. Scheib, Hillside, Ill.

[73] Assignee: Nalco Chemical Company, Oak Brook, Ill.

[21] Appl. No.: 896,929

[22] Filed: Apr. 17, 1978

[51] Int. Cl.² ............................................ G01F 23/24
[52] U.S. Cl. ............................................... 73/304 R
[58] Field of Search ................... 73/304 R, 313, 750; 338/38

[56] References Cited

U.S. PATENT DOCUMENTS

| | | | |
|---|---|---|---|
| 2,138,677 | 11/1938 | Meyer | 73/304 |
| 2,448,783 | 9/1948 | Giers et al. | 73/313 X |
| 3,461,722 | 8/1969 | Martens | 73/304 R |
| 3,777,177 | 12/1973 | Norkum et al. | 73/304 R |

FOREIGN PATENT DOCUMENTS 1133140  7/1962  Fed. Rep. of Germany ........ 73/304 R

*Primary Examiner*—James J. Gill
*Attorney, Agent, or Firm*—Lloyd L. Zickert

[57] ABSTRACT

A level sensing system for determining the quantity of a fluent or flowable material in a container including a level sensor and a monitor wherein the sensor is constructed of a pipe of non-conducting material with pairs of electrodes exposed to the fluent material and connected to resistance bars to produce a proportionate voltage signal across the resistance of the sensor in accordance with the quantity of fluent material. The monitor transforms the signal into a readable output.

12 Claims, 10 Drawing Figures

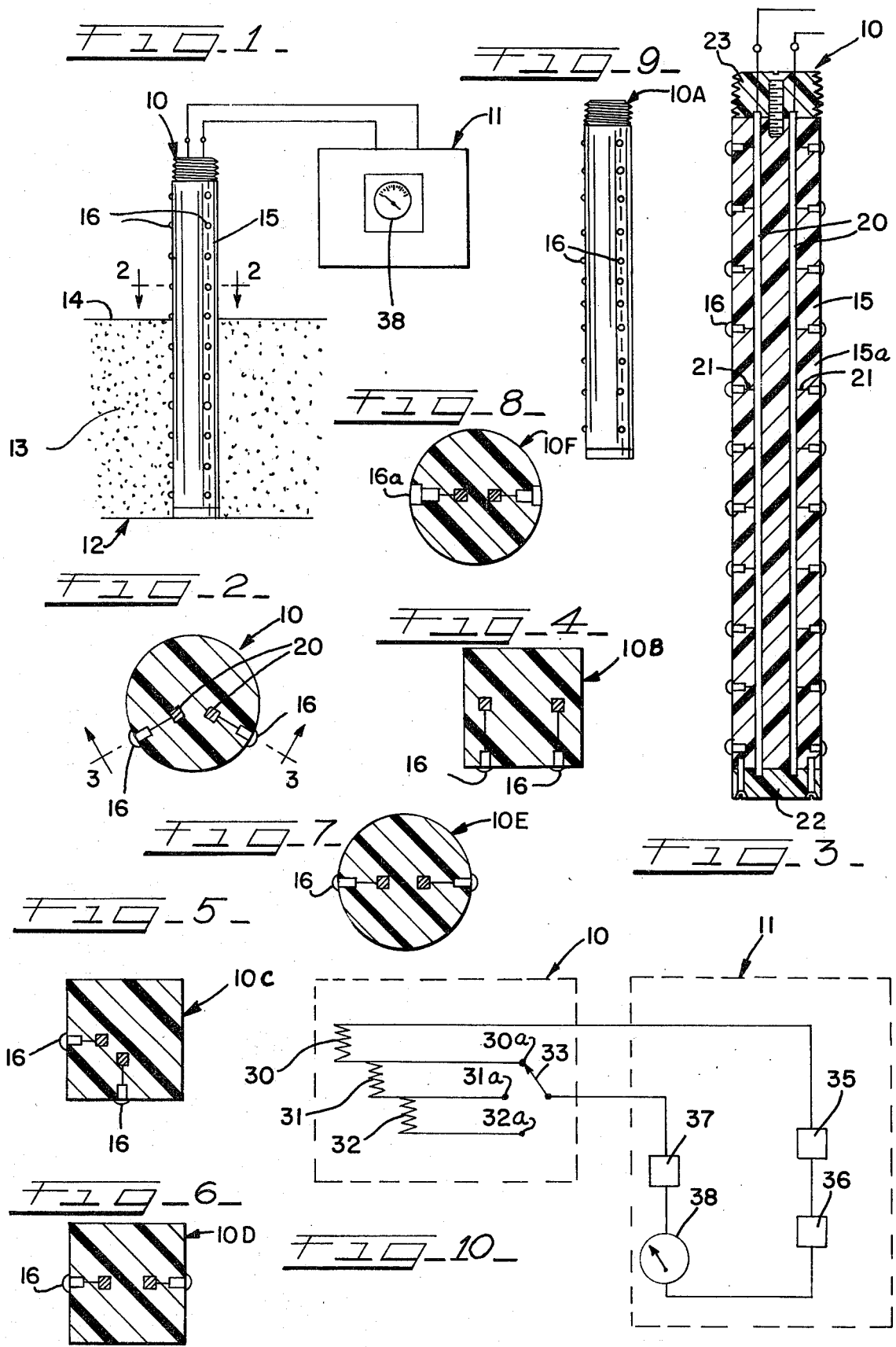

QUANTITY SENSING SYSTEM FOR A CONTAINER

This invention relates in general to a level sensing system for measuring the quantity of a fluent material in a container, and more particularly to a sensor to be connected to a monitor for a level sensing system.

The sensor of the present invention includes a precast pipe of electrically insulating material having mounted therealong in spaced relation a plurality of pairs of electrodes or contacts which are exposed to the material being sensed. Each pair of electrodes may be considered a probe for sensing the level of material. One electrode of each pair is connected to one resistance member embedded within the pipe. The resistance members, forming a sensor resistance circuit, are connected to a monitor having a remote readout station and which translates the signal from the sensor resistance circuit to a measurement. The electrode pairs below the level of the material are shorted out, thereby leaving only the resistance of the resistance members connected to the electrodes above the level in sensor resistance circuit. Either a liquid or a foam may be sensed or any electrically conductive fluent or flowable material.

Heretofore, it has been known to provide sensors of the type disclosed in U.S. Pat. Nos. 3,583,221; 3,653,262; 3,753,200; 3,792,407, and 3,783,689, which include a resistance element that is shorted out below the level of the material and which is constructed by providing a resistance element enclosed by and supported by a jacket diaphragm which when immersed in the material causes progressive contact of the resistance element against a central core or conducting strip to short out the resistance below the level of material. The construction of this sensor is expensive in that it requires special materials, and it is relatively complex in the number of parts used. Operationally, it depends upon the pressure of the material to be actuated, and it is therefore insensitive to foam materials.

The sensor of the present invention is an improvement over the heretofore known types of resistance element sensors in that it is economical to manufacture and can be made from materials which are readily available; it is simpler in structure whereby fewer maintenance problems are encountered; it is completely sealed against the material in the container; and it is capable of sensing foam levels as well as other fluent materials.

It is therefore an object of the present invention to provide a new and improved sensor for use in determining the level of a fluent material in a container and which is economical to make and is of simple construction and rugged to enhance long life.

Other objects, features and advantages of the invention will be apparent from the following detailed disclosure, taken in conjunction with the accompanying sheet of drawings, wherein like reference numerals refer to like parts, in which:

FIG. 1 is a somewhat diagrammatic view of a level sensing system which includes a monitor and the sensor of the present invention which is illustrated as being partly immersed in a container of material;

FIG. 2 is a greatly enlarged transverse cross-sectional view of the sensor taken substantially along line 2—2 of FIG. 1;

FIG. 3 is a greatly enlarged vertical sectional view of the sensor taken substantially along line 3—3 of FIG. 2;

FIG. 4 is a transverse sectional view taken through a modified sensor according to the invention;

FIG. 5 is a transverse sectional view taken through a still further modified sensor according to the present invention;

FIG. 6 is a transverse sectional view taken through a still further modified sensor according to the present invention;

FIG. 7 is a transverse sectional view taken through a still further modified sensor according to the present invention;

FIG. 8 is a transverse sectional view taken through a still further modified sensor according to the present invention;

FIG. 9 is an elevational view of a still further modified sensor according to the invention; and FIG. 10 is a schematic diagram of the sensing system in which the sensor of the present invention is employed to illustrate one form of a monitor in use with the sensor.

Referring now to the drawings and particularly to FIG. 1, the level sensing system illustrated includes generally a level sensor 10 according to the invention that would be located in a container such as a tank and which defines a variable resistance as the function of the level of material therein, and a monitor 11 which would provide a visual readout as to the level of the material in the container in any given units, such as the volume in gallons. Thus, the resistance of the sensor will vary depending upon the level of material in the container. The monitor forms no part of the invention and may be of a conventional type commercially available, and which is capable of translating the effective resistance of the sensor into a level measurement by responding to an electrical signal.

The sensor 10, as seen in FIG. 1, is illustrated as being vertically oriented in a container 12 and resting on the bottom wall thereof, which container is partly filled with a fluent material 13 having a top surface or level 14. It is the level 14 that is measured by the sensor and read out at the monitor 11 in units of volume.

As seen in FIG. 1, the sensor includes a body 15 in the form of a pipe or cylinder with a plurality of pairs of electrodes or contacts 16 arranged in vertically spaced apart relation and being exposed to the material in the container. The electrodes are exposed on the exterior surface of the pipe to the material such that when a pair of the electrodes is immersed in the material, a signal of a predetermined level commensurate with the effective resistance of the sensor will be sensed in the monitor 11.

It will be appreciated that the material 13 may be of any fluent type that is capable of causing electrical conduction between the pairs of electrodes. For example, it could be of an electrically conductive liquid, foam or granular material. This is one advantage over the prior art above mentioned in that the sensor is not dependent upon a pressure from the material in order to obtain a readout of the level of material in the container.

The construction of the sensor 10 is very simple, and as shown particularly in FIGS. 2 and 3, the sensor is constructed of a suitable moldable electrically insulating material that is also chemically inert and capable of having a non-fouling and a non-pitting surface which has low surface tension. For example, the material could be of a polyvinyl chloride, epoxy resin, or Teflon. It is further preferable that the material has good temperature stability so that it can endure flexing or some distortion without failing and also so that it is reliable to handle the necessary thermal stresses it may incur while in a container of widely ranging temperatures.

The sensor 10, as illustrated in FIGS. 2 and 3, is essentially solid and includes a main body portion 15a which has extending vertically therethrough a pair of resistance elements 20 to which are electrically connected each of the pairs of electrodes 16, and wherein it can be readily appreciated that one electrode of each pair is connected to one of the resistance elements and the other electrode is connected to the other of the resistance elements.

The resistance elements 20 may be in the form of any suitable resistance wire or strip having equal resistance per given unit of length therealong, which when shorted out therealong by electrical conduction between a pair of electrodes will change the resistance total of the sensor resistance circuit to be read out by the monitor. It is further seen in the embodiment of FIG. 3 that each of the electrodes 16 is connected to a resistance element by a suitable conductor 21·at equally spaced apart points along the element. The pairs of electrodes are also equally spaced apart, and as such the sensor would be used in a container of regular shape where each increment of material level change between electrode pairs would represent the same resistance and volume change. Where the container or tank would be of irregular shape such that equal increments in change of material level would represent unequal changes in volume, the spacing of the electrode pairs would be modified accordingly as illustrated in the sensor embodiment of FIG. 9, which would be useful in a tank where a given volume per increment of material level change near the bottom and top of the tank would require a greater level change increment than near the middle levels of the tank. The sensor 10A in FIG. 9 shows the electrode pairs 16 near the central levels to be closer together than those near the top and bottom. However, the connections between the electrodes and the resistance elements will be such that equal resistances are provided between the electrode pairs. It can be appreciated that the resistance elements, the conductors and the electrodes are all molded into the central body portion 15a during construction.

Because the opposite ends of the resistance elements would be exposed following molding of the pipe body, the assembly is completed by suitably fastening a cap 22 of the same or a suitable material to the lower end of the central body portion 15a and by suitably fastening a cap 23 of the same or suitable material to the upper end of the central body portion 15a. Further, it is preferable that the upper cap 23 include external threads for assisting in the interconnection with a coupling member for the container or for the electrical connection to the monitor.

The resistance along the resistance elements is substantially uniformly distributed, such as one or more ohms per inch, so that during operation, a uniform change in output of the sensor is produced when a part of the resistance elements is shorted out by the electrical connection across the pair of electrodes due to the level of the material in the container. It can now be appreciated that the fluent material 13 in the container causes electrical conduction across each pair of electrodes immersed in the material which shorts out the resistance below the uppermost pair of electrodes immersed, thereby regulating the resistance of the sensor sensed by the monitor. It can further be appreciated that once the caps 22 and 23 are secured to the body 15a, a completely sealed-in unit is provided against the intrusion of the material in the container.

The pipe or rod-shaped sensor is uniform in cross section throughout its length and is illustrated as being cylindrical in cross section in FIGS. 1, 2 and 3, but it may be appreciated that it may take any desired cross-sectional shape. For example, the embodiment of FIG. 4 is shown to be square or rectangular in cross section as is the embodiment of FIG. 5, but other cross-sectional shapes may be utilized.

The electrodes 16 are of a chemically inert material as is the body of the sensor and, for example, they may be of stainless steel. However, any desirable material may be used which is chemically inert but yet of an electrically conductive nature. Further, the length or height of the sensor may be of any desired length depending upon its use and the container in which it is to be placed. A pair of electrodes 16 or contacts may be considered to constitute a single probe, and therefore a plurality of probes are provided on each sensor. Each one, when immersed in the material, will cause a different resistance readout of the sensor. Further, while the pipe-shaped body of the sensor is illustrated as being solid in cross section, it can be appreciated it may be hollow. The resistance elements embedded in the material of the body are electrically insulated from each other and also from each electrode of the other of the resistance elements to which it is not connected. The electrodes connected to one resistance element are electrically insulated from the electrodes connected to the other resistance element, and each electrode along each resistance element and its associated conductor connecting it to the resistance element are insulated from each other to the point of connection along the resistance element.

The arcuate spacing between the electrodes 16 may vary but preferably be at least ninety degrees apart where the external diameter of the pipe is approximately three-fourths of an inch. More particularly, as an example of a suitable sensor, the resistance elements might have a resistance rating of a given ohmic value per inch, such as five ohms per inch, and each pair of electrodes might be spaced about one inch apart as would be their connections to a resistance element where the external diameter of the pipe is about three-fourths of an inch, and the arcuate distance between the electrodes is about 120 to 130 degrees.

The sensor embodiment of FIG. 4, generally designated as 10B, differs from the embodiment of FIGS. 1, 2 and 3 only in that the cross-sectional shape is square or rectangular. Further, the sensor embodiment of FIG. 4 shows both electrodes 16 of a pair to be on one face of the pipe. By contrast, the sensor embodiment of FIG. 5 differs from the embodiment of FIG. 4 only in that each pair of electrodes 16 has one electrode located on one of the pipe faces, while another electrode is located on an adjacent pipe face, and this embodiment is generally designated by the numeral 10C. The sensor embodiment 10D illustrated in FIG. 6 differs from the sensors 10B and 10C in that the electrodes of each pair are located on opposite parallel pipe faces.

FIGS. 7 and 8 illustrate further sensor embodiments according to the invention. The sensor 10E illustrated in FIG. 7 differs from the embodiment of FIG. 2 only in that the electrodes 16 of a pair are spaced 180 degrees apart. The sensor 10F illustrated in FIG. 8 differs particularly from the embodiment of FIG. 7 and the other embodiments in that the electrodes 16a are flush mounted with the outer face of the pipe. While not shown, the electrodes on the square in cross section pipes could also be flush mounted if desired.

To further illustrate the operation and general nature of a leveling system in which the sensor of the present invention is included, reference is made to the electrical schematic diagram in FIG. 6 illustrating one type of monitor that could be used with the sensor. Particularly, the sensor 10 is illustrated in a manner showing three different resistance elements 30, 31, 32 that would represent three different levels of electrode pairs, a swinging conductive arm 33 capable of contacting contacts 30a, 31a or 32a and movable between these contacts to represent the various levels of electrodes as the material in the container rises or lowers or changes, so that a varying resistance would be present in the sensor 10. The leads in the sensor 10 are connected to the monitor 11, which includes broadly a constant voltage source 35, a current limiting circuit 36, a current or voltage output circuit 37 and a meter 38. Of course, it can be appreciated that any suitable type of monitor may be provided, and that the monitor 11 is only illustrative of the type that may be used in order to measure the resistance of the sensor 10 and obtain a readout. The varying resistance of the sensor 10 will then be monitored and read out at the meter 38 in order to determine the level of the material in a container. It can be appreciated that the readout may be calibrated for any desired units. Further, it may be appreciated that the sensor may be replaced with one of like kind without the need of recalibration.

It will be understood that modifications and variations may be effected without departing from the scope of the novel concepts of the present invention, but it is understood that this application is to be limited only by the scope of the appended claims.

The invention is hereby claimed:

1. A level sensor adapted to be connected to a monitor for measuring the quantity of an electrically conductive fluent material in a container, said sensor comprising an elongated pipe of uniform cross section throughout its length adapted to stand vertically within the container for sensing the quantity of material therein, said pipe being of electrically non-conducting material having chemically inert and low surface tension characteristics, a plurality of pairs of electrodes carried by said pipe at the outer surface thereof in vertically spaced apart relation, the electrodes of each pair being of the same vertical level, a pair of resistance members within said pipe, one electrode of each pair connected to one of said resistance members at equal vertically spaced apart points therealong, and the other electrode of each pair connected to the other of said resistance members at equal vertically spaced apart points therealong.

2. The level sensor defined in claim 1, wherein the pipe is solid with the electrodes and resistance members molded therein such that each resistance member and each electrode is electrically insulated from each other.

3. The level sensor defined in claim 1, wherein the pairs of electrodes are equally spaced apart.

4. The level sensor defined in claim 1, wherein the pairs of electrodes are variably spaced apart.

5. The level sensor defined in claim 1, wherein the resistance along each resistance member is uniform and the connections of the electrodes to a resistance member are equally spaced apart.

6. The level sensor defined in claim 1, wherein the cross section of the pipe is cylindrical.

7. The level sensor defined in claim 1, wherein the cross section of pipe is rectangular.

8. The level sensor defined in claim 1, wherein the cross section of the pipe is polygonal.

9. The level sensor of claim 6, wherein the electrodes of each pair are spaced at least ninety degrees apart on a pipe having an external diameter of about three-fourths of an inch.

10. The level sensor of claim 6, wherein the electrodes of each pair are spaced 130 to 180 degrees apart.

11. The level sensor defined in claim 1, wherein the electrodes protrude from the outer surface of the pipe.

12. The level sensor defined in claim 1, wherein the electrodes are flush mounted on the outer surface of the pipe.

* * * * *

UNITED STATES PATENT AND TRADEMARK OFFICE
CERTIFICATE OF CORRECTION

PATENT NO. : 4,169,377
DATED : October 2, 1979
INVENTOR(S) : William F. Scheib

It is certified that error appears in the above-identified patent and that said Letters Patent are hereby corrected as shown below:

Col. 6, line 5, change the second occurrence of "of" to --at--; and

Col. 6, line 28, after "of" insert --the--.

Signed and Sealed this

Eighteenth Day of December 1979

[SEAL]

Attest:

SIDNEY A. DIAMOND

Attesting Officer

Commissioner of Patents and Trademarks